(12) United States Patent
Baker et al.

(10) Patent No.: US 7,603,885 B2
(45) Date of Patent: Oct. 20, 2009

(54) METHOD FOR TESTING A MASS FLOW RATE METER

(75) Inventors: Roger Baker, Cambridge (GB); Tao Wang, Wellingborough (GB); Yousif Hussain, Northampton (GB); Jim Woodhouse, Cambridge (GB)

(73) Assignee: Krohne AG, Basel (CH)

( * ) Notice: Subject to any disclaimer, the term of this patent is extended or adjusted under 35 U.S.C. 154(b) by 482 days.

(21) Appl. No.: 11/531,526

(22) Filed: Sep. 13, 2006

(65) Prior Publication Data

US 2007/0113678 A1    May 24, 2007

(30) Foreign Application Priority Data

Sep. 14, 2005   (DE)   ................ 10 2005 044 008

(51) Int. Cl.
*G01F 25/00*   (2006.01)
(52) U.S. Cl. ........................................... 73/1.16
(58) Field of Classification Search ................ None
See application file for complete search history.

(56) References Cited

U.S. PATENT DOCUMENTS

| 4,470,294 | A | 9/1984 | Hamel |
| 4,845,989 | A | 7/1989 | Titlow et al. |
| 5,926,096 | A | 7/1999 | Mattar et al. |
| 6,092,409 | A | 7/2000 | Patten et al. |
| 6,758,103 | B2 | 7/2004 | Hansen |

FOREIGN PATENT DOCUMENTS

| DE | 19840904 A1 | 3/2000 |
| DE | 10356383 A1 | 6/2005 |

*Primary Examiner*—Robert R Raevis
(74) *Attorney, Agent, or Firm*—David S. Safran; Roberts Mlotkowski Safran & Cole, P.C.

(57) ABSTRACT

A method of testing a mass flow rate meter functioning on the Coriolis principle, in which an apparatus of the mass flow rate meter is subjected to a predetermined oscillation excitation and the associated oscillation response is recorded. Then the recorded oscillation response is compared with a previously recorded oscillation response. Testing of the Coriolis mass flow rate meter with regard, for example, to error tolerances in the manufacturing or with regard to a calibration condition is thereby enabled.

9 Claims, 2 Drawing Sheets

METHOD FOR TESTING A MASS FLOW RATE METER

BACKGROUND OF THE INVENTION

1. Field of the Invention

The invention relates to a method for testing a mass flow rate meter which functions according to the Coriolis principle, wherein an apparatus of the mass flow rate meter is subjected to a predetermined oscillation excitation and the associated oscillation response is recorded.

2. Description of Related Art

Coriolis mass flow rate meters generally have a measuring tube or a plurality of measuring tubes which, during operation, are excited into oscillation. A medium whose mass flow rate is to be determined and which flows through the measuring tube or tubes is thereby subjected to a Coriolis force, which leads to a change in the oscillation displacement relative to the oscillation excitation of the measuring tube or tubes. This change is used, for example, in the form of a phase difference in an oscillating measuring tube at sites spaced from each other for direct determination of the mass flow rate.

A difficulty with Coriolis mass flow rate meters is that, when they are used, over time, changes can occur which lead to a loss of measuring accuracy. In such a case, recalibration of the mass flow rate meter becomes necessary.

In order to rectify this problem, and in particular, to record a condition, which requires a recalibration of this type, it has been proposed in U.S. Pat. No. 6,092,409 that a method of the aforementioned type be used wherein a measuring tube of the Coriolis mass flow rate meter is excited into oscillation while a fluid flows through it, and through evaluation of the oscillations recorded, the density of the flowing medium is concluded. If the density of the flowing medium is known, by this means, the accuracy of the Coriolis mass flow rate meter during measuring operation can be determined. If appropriate, a warning signal may be issued, showing that the mass flow rate meter no longer measures sufficiently accurately and will have to be recalibrated or investigated regarding a possible error. However, a problem with this known method is that the density of the flowing medium must be known.

SUMMARY OF THE INVENTION

Therefore, it is a primary object of the present invention to provide a method of the above-mentioned type for testing a Coriolis mass flow rate meter with which functional testing can be carried out regardless of the medium flowing in a measuring tube.

Based on the method described above, this task is thereby solved in that the oscillation response recorded is compared with a previously recorded oscillation response.

Therefore, according to the invention, it is provided that a previously determined reference is used for the recorded oscillation response to the predetermined oscillation excitation. This reference oscillation response may have been previously recorded with the same or another Coriolis mass flow rate meter of the same type. Thus, on the one hand, the chronological changes may be observed with a particular Coriolis mass flow rate meter while, on the other hand, a comparison may be carried out with an ideal device which determines the reference oscillation response.

Here, it is essential that, additionally or alternatively to the measuring tube of the Coriolis mass flow rate meter, apparatus other than the measuring tube can also be subjected to oscillation excitation. In particular, for oscillation excitation of the measuring tube, an oscillation generator typically already present with a Coriolis mass flow rate meter may be used. However, separate oscillation generators may also be provided, with which other components of the mass flow rate meter can be excited. A similar principle applies for an oscillation transducer for sensing the oscillation response.

A plurality of parameters may be recorded as the oscillation response. According to a preferred further development of the invention, it is provided that at least the frequency spectrum generated is recorded. Additionally or alternatively thereto, according to a preferred embodiment of the invention, it is provided that damping factors are recorded as the oscillation responses.

Furthermore, preferably, it is provided that the damping factors are recorded in frequency-selective manner and, particularly preferably, frequency-selective for a plurality of natural frequencies.

The oscillation excitation can be carried out in a variety of ways. According to a preferred further development of the invention, it is provided that a transient excitation is used as the predetermined oscillation excitation. A transient excitation of this type may, for example, comprise a single stroke or blow with an object such as, for example, a hammer.

Alternatively, according to a preferred further development of the invention, continuous excitation with a predetermined frequency spectrum is provided as the predetermined oscillation excitation. In principle, the use of a plurality of frequencies may be provided here. However, according to a preferred further development of the invention, it is provided that the predetermined frequency spectrum has exactly one frequency. Whereas on transient excitation, a plurality of natural frequencies is typically found in the oscillation response, with continuous excitation using preferably exactly one frequency, a forced oscillation can be generated, which lies outside a resonant frequency. This can be advantageous in that thereby particular mechanical characteristics of the Coriolis mass flow rate meter can be determined that are barely accessible via observation of natural frequencies.

The oscillation responses recorded can be evaluated in a variety of ways. According to a preferred further development of the invention, it is provided that the deviations of the recorded oscillation response from the previously recorded oscillation response are determined, for which purpose, various methods can be used, such as methods of time-dependent Fourier transformation.

Particularly preferably, it is provided that, based on the deviations found, an assessment of the mass flow rate meter is automatically carried out. This assessment can preferably include an assessment of the readiness for use of the Coriolis mass flow rate meter. Assessment of the readiness for use of the Coriolis mass flow rate meter implies, in particular, that a determination is made of whether an originally existing calibration condition still exists. Therefore, if the deviations exceed predetermined threshold values, notification is given that recalibration of the Coriolis mass flow rate meter is required.

According to a preferred further development of the invention, assessment of the Coriolis mass flow rate meter can also include a concrete diagnosis in the context of which, any error in the mass flow rate meter is output. The basis of such a diagnosis according to a preferred further development of the invention may be a "library" of oscillation responses that are typical for a particular error. These oscillation responses, each of which is typical for a particular error, may have been recorded beforehand, although they may also have been determined by computation.

Finally, it is pointed out that use of the method according to the invention may, in particular, be provided in the manufacturing of a Coriolis mass flow rate meter. That is, in each of various manufacturing stages, a particular reference oscillation response is to be achieved. Only if the relevant oscillation response is achieved at predetermined error tolerances does the device pass on to the next manufacturing stage. Otherwise, the device must be reworked until the respective reference oscillation response at the predetermined error tolerances is achieved, or else the device is treated as a reject.

Seen in detail, there are many possibilities for designing and further developing the method according to the invention. Reference is made in this regard to the following detailed description of preferred exemplary embodiments in conjunction with the accompanying drawings.

DETAILED DESCRIPTION OF THE INVENTION

During manufacturing of a Coriolis mass flow rate meter, various requirements are placed on construction tolerances, material properties and other manufacturing parameters. However, even when all of these requirements are fulfilled, the possibility cannot be precluded that the mass flow rate meter finally fails to meet the demands or cannot be used at all, and therefore, has to be reworked. In conjunction with the manufacturing parameters, the smallest deviations may lead to a device of this type, which no longer has sufficient measuring accuracy.

Furthermore, it is also possible that factors or other matters whose importance or effects cannot be calculated could occur during measuring operation of a Coriolis mass flow rate meter, influencing the operation of the mass flow rate meter. In this way, for example, the calibration condition of the Coriolis mass flow rate meter could be lost so that the measuring results obtained are no longer reliable.

With the present invention, it is now possible, in a simple manner, to test a Coriolis mass flow rate meter with regard to the above mentioned problems, both in its manufacture and during actual operation. For this purpose, predetermined oscillation excitation of the Coriolis mass flow rate meter is used, leading to oscillations at a natural frequency or a plurality of natural frequencies of the Coriolis mass flow rate meter, or leading to the Coriolis mass flow rate meter carrying out forced oscillations.

For this purpose, the Coriolis mass flow rate meter is preferably clamped in a suitable device, for example, similar to that for installation in a pipe conduit system. This applies for the testing of a Coriolis mass flow rate meter during its manufacturing. A Coriolis mass flow rate meter which is already in use may, therefore, remain installed in the respective pipe conduit system. That is, it is not necessary, for use of the method according to the invention, to remove the Coriolis mass flow rate meter from the pipe conduit system in which it is installed for measuring operation.

It is essential to the invention that, due to the predetermined oscillation excitation of at least one aspect of the Coriolis mass flow rate meter, an oscillation response is achieved and recorded, which serves as a "fingerprint," that is, as a characteristic oscillation pattern. The comparison of the respective "fingerprint" recorded with a previously recorded "fingerprint" may serve to record deviations occurring in the Coriolis mass flow rate meter relative to a reference, or over time. It is fundamentally to be assumed that practically any mechanical change in the Coriolis mass flow rate meter will lead to a change in the "fingerprint." By this means, a very sensitive testing method is made available with which even the smallest deviations of the Coriolis mass flow rate meter as compared to a reference can be recorded.

Figure 1:
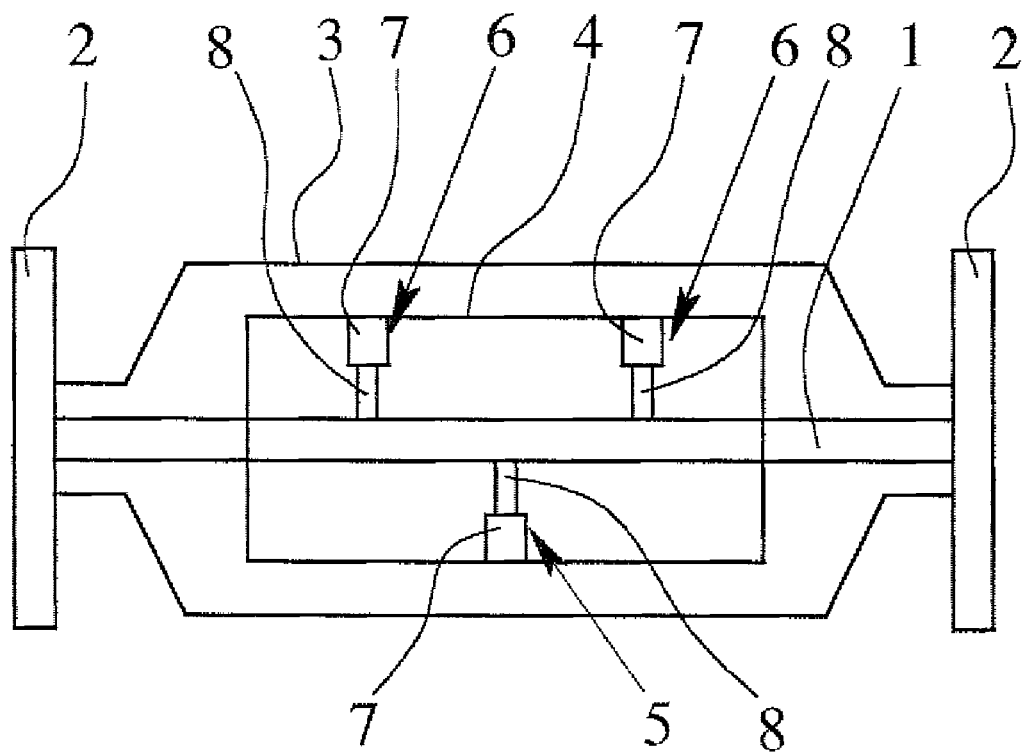
FIG. 1 is a schematic representation of a Coriolis mass flow rate meter for use with the method according to the invention.

With a Coriolis mass flow rate meter suitable for the method according to the invention and shown in FIG. 1, for example, a single straight measuring tube 1 is provided, which can be installed by means of flanges 2 in a pipe conduit system 2 (not shown in further detail). The Coriolis mass flow rate meter has a housing 3 within which an inner cylinder 4 is provided, which surrounds the central region of the measuring tube 1 and serves as an abutment for an oscillation exciter 5 and two oscillation sensors 6 which comprise a magnetic coil 7 and a magnet 8 arranged in the magnetic coil 7, the magnet acting on the measuring tube 1 or following its oscillations.

With such a Coriolis mass flow rate meter, in order to record the oscillation response, an oscillation sensor 6 can be used when the predetermined oscillation excitation affects the measuring tube 1. In order to record the oscillation response attained by the predetermined oscillation excitation, a plurality of further methods may also be used, including the use of acceleration sensors, acoustic measuring methods, the use of optical interference patterns and other optical methods, for example, using fibre-optic sensors, which serve to measure the oscillation displacement.

In order to record the "fingerprint" of a Coriolis mass flow rate meter, according to a preferred exemplary embodiment of the invention, it may be brought about that the Coriolis mass flow rate meter experiences a transient oscillation excitation, for example, by means of a blow. For this purpose, the Coriolis mass flow rate meter is preferably clamped perpendicular to its oscillation displacement. Then, the decaying oscillation signal from the free oscillation is recorded, for example, by means of a microphone or an electromagnetic sensor attached to the measuring tube 1. From the recorded signal, the natural frequencies and the associated damping factors can be determined with time-dependent Fourier transformation (FFT). The "fingerprint" can thus be described with a number of 2-D points $(f_i, \zeta_i)$, $f_i$ representing the natural frequencies and $\zeta_i$ being the associated damping factors at these frequencies.

Corresponding testing of the "fingerprint" of the Coriolis mass flow rate meter is carried out, for example, in three successive stages during the manufacturing process for the device. The quality of the Coriolis mass flow rate meters can then be determined based on these "fingerprints" through an automatic comparison using a reference device. A corresponding representation is shown schematically in FIG. 2. For a variety of different natural frequencies $f_1, f_2, \ldots f_n$, allowed frequency deviations and the associated permitted damping factors $\zeta$ are shown there. If the values determined for a device do not fall within the shaded permitted regions, these devices must be reworked or sorted out.

Figure 2:
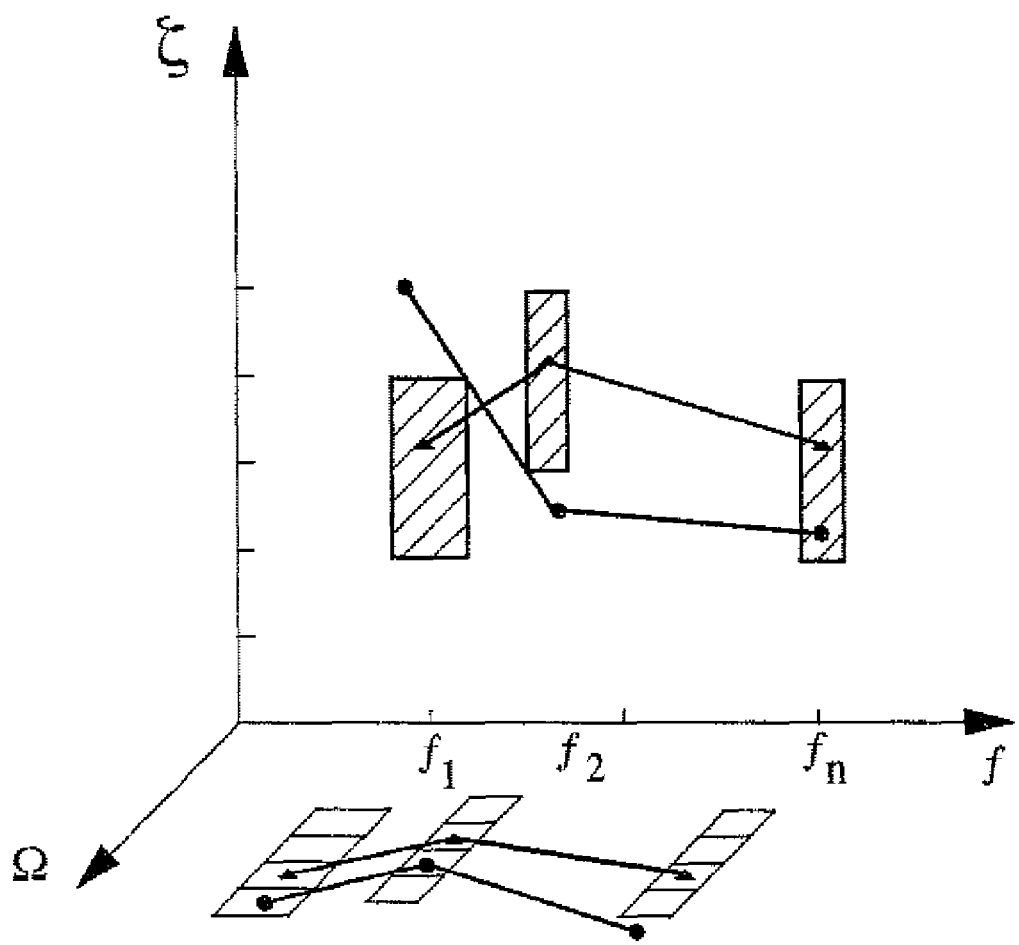
FIG. 2 is a graphic representing recorded deviations in an oscillation response for assessing a Coriolis mass flow rate meter.

In FIG. 2, the measured values shown as triangles represent values that lie within the specification. Therefore, the associated device can be employed for measuring or may continue to be used. In contrast, for a measuring device whose associated measured values are shown by circles lie outside the permitted specification, rework or recalibration is required. It can also be seen from FIG. 2 that, apart from the damping, other frequency-dependent parameters may be used, which are denoted, by way of example, as $\Omega$.

By way of deviation from the previously described preferred exemplary embodiment of the invention, it is also possible according to another preferred exemplary embodiment of the invention to excite the Coriolis mass flow rate meter into forced oscillation, either with a single oscillation or with a plurality of different oscillations.

According to a further preferred exemplary embodiment of the invention, it is also possible to subject the Coriolis mass flow rate meter to ultrasonic signals in order to obtain the frequency spectrum that is generated by direct or reflected modes of the ultrasonic signals. Since the wavelengths of the ultrasonic signals are significantly shorter than are achievable by mechanical excitation of oscillations in the Coriolis mass flow rate meter, by this means, substantially more sensitive test results can be obtained.

According to a preferred exemplary embodiment of the invention, it is also provided that a "library of fingerprints" is created and used for error diagnosis. In the process, particular characteristic fingerprints of typical errors are assigned to the Coriolis mass flow rate meters, that is, typical deviations from the reference. A "library of fingerprints" of this type may be based on empirical data. However, it is also possible to prepare a "library" of this type by computational methods.

What is claimed is:

1. Method of testing a mass flow rate meter functioning on the Coriolis principle, comprising the steps of:
    subjecting an apparatus of the mass flow rate meter to a predetermined oscillation excitation and recording the associated oscillation response, and
    comparing the recorded oscillation response with at least one previously recorded oscillation response;
    wherein at least one damping factor is recorded as the oscillation response, and
    wherein the damping factor is recorded in a frequency-selective manner.

2. Method according to claim 1, wherein a plurality of damping factors are recorded in frequency-selective manner for a plurality of natural frequencies.

3. Method according to claim 1, wherein deviations of the recorded oscillation response from the previously recorded oscillation response are determined during said comparing step.

4. Method according to claim 3, wherein, based on the deviations determined, an assessment of the mass flow rate meter is carried out automatically.

5. Method of testing a mass flow rate meter functioning on the Coriolis principle, comprising the steps of:
    subjecting an apparatus of the mass flow rate meter to a predetermined oscillation excitation and recording the associated oscillation response, and
    comparing the recorded oscillation response with at least one previously recorded oscillation response;
    wherein a frequency spectrum generated is recorded as the oscillation response.

6. Method according to claim 5, wherein at least one damping factor is recorded as the oscillation response.

7. Method of testing a mass flow rate meter functioning on the Coriolis principle, comprising the steps of:
    subjecting an apparatus of the mass flow rate meter to a predetermined oscillation excitation and recording the associated oscillation response, and
    comparing the recorded oscillation response with at least one previously recorded oscillation response;
    wherein a transient excitation is provided as the predetermined oscillation excitation, and
    wherein said transient excitation is provided by a stroke or a blow.

8. Method of testing a mass flow rate meter functioning on the Coriolis principle, comprising the steps of:
    subjecting an apparatus of the mass flow rate meter to a predetermined oscillation excitation and recording the associated oscillation response, and
    comparing the recorded oscillation response with at least one previously recorded oscillation response;
    wherein a continuous excitation with a predetermined frequency spectrum is provided as the predetermined oscillation excitation.

9. Method according to claim 8, wherein the predetermined frequency spectrum has exactly one frequency.

* * * * *